(12) United States Patent
Hjelm et al.

(10) Patent No.: US 9,282,084 B2
(45) Date of Patent: Mar. 8, 2016

(54) METHOD AND APPARATUS FOR PROVISIONING A TEMPORARY IDENTITY MODULE USING A KEY-SHARING SCHEME

(75) Inventors: Johan Hjelm, Tokyo (JP); Michael Åström, Rönninge (SE); Gerardo Montero Arizmendi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 184 days.

(21) Appl. No.: 13/990,524

(22) PCT Filed: Dec. 7, 2010

(86) PCT No.: PCT/EP2010/069083
§ 371 (c)(1),
(2), (4) Date: May 30, 2013

(87) PCT Pub. No.: WO2012/076041
PCT Pub. Date: Jun. 14, 2012

(65) Prior Publication Data
US 2013/0254544 A1  Sep. 26, 2013

(51) Int. Cl.
| H04L 29/06 | (2006.01) |
| H04L 9/08 | (2006.01) |
| H04W 12/04 | (2009.01) |
| H04W 12/06 | (2009.01) |

(52) U.S. Cl.
CPC .............. *H04L 63/061* (2013.01); *H04L 9/085* (2013.01); *H04L 63/06* (2013.01); *H04L 63/0853* (2013.01); *H04L 63/108* (2013.01); *H04W 12/04* (2013.01); *H04W 12/06* (2013.01)

(58) Field of Classification Search
None
See application file for complete search history.

(56) References Cited

U.S. PATENT DOCUMENTS

| 7,191,219 | B2 | 3/2007 | Udell et al. |
| 7,257,844 | B2 * | 8/2007 | Woodward ..................... 726/31 |
| 2003/0026432 | A1 | 2/2003 | Woodward |
| 2003/0088782 | A1 * | 5/2003 | Forrest .......................... 713/186 |
| 2011/0035584 | A1 * | 2/2011 | Meyerstein et al. ........... 713/155 |

FOREIGN PATENT DOCUMENTS

| CN | 1274448 A | 11/2000 |
| GB | 2451505 A | 2/2009 |
| WO | 0054455 A1 | 9/2000 |

OTHER PUBLICATIONS

3rd Generation Partnership Project. 3GPP TR 33.812 V9.2.0 (Jun. 2010). 3rd Generation Partnership Project; Technical Specification Group Services and System Aspects; Feasibility study on the security aspects of remote provisioning and change of subscription for Machine to Machine (M2M) equipment (Release 9). Jun. 2010, pp. 1-87.

(Continued)

*Primary Examiner* — Kaveh Abrishamkar
*Assistant Examiner* — Tri Tran
(74) *Attorney, Agent, or Firm* — Murphy, Bilak & Homiller, PLLC

(57) ABSTRACT

A method and apparatus for providing a temporary identity module to a device (1) in a communication network. An RO Server (2) receives a request for an identity module (S1) from the device (1). It then obtains an identity module and generates an encryption key (S4, S5). The encryption key is partitioned into a plurality of slices such that no slice comprises the whole encryption key (S6). Each slice is sent (S8, S9) to respective further devices (10, 11) accessible by the server (2) such that no single further device (10, 11) receives sufficient slices to reconstruct the encryption key. A location key is generated (S10) that identifies each slice and the further device (10, 11) to which each slice has been sent. The identity module is encrypted using the encryption key (S11) and sent to the device (1) along with the location key (S12). The device (1) can subsequently use the location key to obtain the slices and reconstruct the encryption key.

13 Claims, 4 Drawing Sheets

(56) References Cited

OTHER PUBLICATIONS

3rd Generation Partnership Project. "Introducing term MCIM to TR 33.812." 3GPP TSG SA WG3 Security—S3#54, S3-090164, Jan. 19-23, 2009, pp. 1-55, Florence, Italy.

Geambasu et al. "Publications." Vanish Self-Destructing Digital Data. University of Washington. 2011. <http://vanish.cs.washington.edu/research.html>.

Unknown, Author. "Distributed hash table." 2013. <http://en.wikipedia.org/wiki/Distributed_hash_table>.

\* cited by examiner

METHOD AND APPARATUS FOR PROVISIONING A TEMPORARY IDENTITY MODULE USING A KEY-SHARING SCHEME

TECHNICAL FIELD

The invention relates to the field of providing a temporary identity module to a device.

BACKGROUND

Communications devices, such as mobile telephones or personal computers, allow a subscriber to attach to a communication network and communicate with other devices. Furthermore, a growth area is that of machine to machine (M2M) communication, in which communications are sent between different devices without human intervention. Examples of the use of M2M communication include sensor networks (for example, networks for monitoring weather conditions), surveillance equipment (for example alarm systems, video monitoring, and so on), vehicle fleet management, vending machines, monitoring manufacturing and so on.

It is predicted that in the long term future, there will be billions of M2M devices, and the number of M2M devices will far exceed the number of devices used for communication between humans (such as mobile telephones, personal computers and so on).

When a device wishes to attach to an existing 3GPP mobile access network, it must register with the network and be authenticated. Registration and authentication are handled using information contained in a Subscriber Identity Module (SIM) or Universal Subscriber Identity Module (USIM) at the device. Each device is uniquely identified by an International Mobile Subscriber Identity (IMSI) that is stored at the SIM/USIM.

A USIM may be obtained by downloading from a remote node. This is described in 3GPP standard TS 33.812. TS 33.812 discloses a system in which a device initially attaches to a network using standard 3GPP radio technologies. The device receives an initial authentication and authorization for a limited set of operations from the network provider to which the device is connected. The limited authorization is used to trigger the authentication and authorization of the connection to a provider of shared secrets, authorization certificates, and services which are attached to the subscription of the user of the device. These are downloaded into a secure area of the device, so that the shared secret and authentication certificates can be used to authenticate and authorize the device to confirm that it is being used under the user's subscription towards the network to which it has attached.

Document TR 33.812 describes several variations that are intended to enhance security, operability, and other factors. These include methods which leverage the presence of a Universal Integrated Circuit Card (UICC), as well as methods which assume that a UICC is not present.

The mechanisms described in TR 33.812 are intended to establish communication between a device and its home network, and are intended for devices terminals which are reusable. In other words, a device may establish a connection using its temporary ID on multiple occasions.

In some circumstances a device may be designed for one-time (or extremely rare) usage. This is most likely in M2M scenarios, although it is possible that devices such as user terminals may also require a one-time temporary ID.

In a M2M application, a device could sit silently for potentially long periods, then wake up and send data before going back to "sleep". An example of such a device include a device to be used during road works, which is positioned to alert workers about changing conditions, such as traffic on a seldom used access road. A further example of such a device is one that is designed to detect and report a rise in the water level of a normally dry river. A further example of device that requires a one-time temporary ID is a postage parcel, which sends a message when it has arrived and is being opened. A further example is that if a device located in a deformation zone of a vehicle, which sends an alert when it is being deformed.

In scenarios such as those described above, it is not desirable for the terminal to download a USIM for continuous use. This would be an inefficient use of resources and there is a limited number of IMSIs that can be associated with a USIM.

When using a one-time temporary ID, it is desirable for it to become unavailable for use after a time. There are methods available to remove a digital object such as a downloaded USIM which is not required to be used further. Such methods include using a counter or timer to determine when to remove the digital object. However, it is easy for a malicious attacker to fool a system that relies on a counter or timer.

SUMMARY

The claimed invention discloses a method by which a temporarily allocated identity module can be provided to a device, and its destruction can be assured without using a counter or timer system. According to a first aspect, there is provided a device for use in a communication network. The device is provided with a first transmitter for sending a request for an identity module to a Registration Operator (RO) Server. A first receiver is provided for receiving from the RO Server an encrypted identity module and a location key. The location key includes the location of encryption key slices stored at further devices. A second transmitter is provided for sending a request for an encryption key slice to each further device identified by the location key, and a second receiver is provided for receiving from each further device an encryption key slice. The device has a first processor for reconstructing the received encryption key slices to form an encryption key and a second processor for using the reconstructed encryption key to decrypt the received encrypted identity module. In this way, the device can reconstruct the key using encryption key slices obtained from other nodes.

As an option, the first processor is further arranged to determine that the device has received insufficient encryption key slices to reconstruct the encryption key. In the event of such a determination, the device will a request for a new identity module to the server.

As an option, the identity module comprises any of a Machine Communication Identity Module, a virtual Subscriber Identity Module, a Soft Subscriber Identity Module, a smart card, an encryption chip and a Universal Subscriber Identity Module.

According to a second aspect, there is provided an RO Server for use in a communication network. The RO server is provided with a first receiver for receiving from the device a request for an identity module. The RO server is also provided with means for obtaining an identity module, which could for example be a transmitter and receiver for obtaining an identity module from another node, or a first processor for generating the identity module. A second processor is arranged to generate an encryption key and partition the encryption key into a plurality of encryption key slices such that no encryption key slice comprises the whole encryption key. A first transmitter is provided for sending each encryption key slice to respective further devices accessible by the server such that no single further device receives sufficient encryption key slices to reconstruct the encryption key. A third processor is arranged to generate a location key. The location key identifies each encryption key slice and the further device to which it has been sent, and the third processor is further arranged to encrypt the identity module using the encryption key. The server is also provided with a second transmitter for sending the encrypted identity module to the device and a third transmitter for sending the location key to the device, the location key usable by the device to obtain the encryption key slices and reconstruct the encryption key.

As an option, the identity module comprises any of a Machine Communication Identity Module, a virtual Subscriber Identity Module, a Soft Subscriber Identity Module, a smart card, an encryption chip and a Universal Subscriber Identity Module.

The second processor is optionally further arranged to, prior to sending each encryption key slice to respective further devices, select further devices to which each encryption key should be sent. As a further option, the second processor is arranged to select further devices based on any of an expected length of time that a further device will be connected to the communication network, capabilities of a further device, and services provided by the further device.

The RO Server is optionally one of a RO and a Platform Validation Authority.

According to a third aspect, there is provided a method of providing a temporary identity module to a device in a communication network. An RO Server receives a request for an identity module from the device. It then obtains an identity module and generates an encryption key. The encryption key is partitioned into a plurality of encryption key slices such that no encryption key slice comprises the whole encryption key. Each encryption key slice is sent to respective further devices accessible by the server such that no single further device receives sufficient encryption key slices to reconstruct the encryption key. A location key is generated that identifies each encryption key slice and the further device to which each encryption key slice has been sent. The identity module is encrypted using the encryption key and sent to the device along with the location key. The device can subsequently use the location key to obtain the encryption key slices and reconstruct the encryption key.

The identity module optionally comprises any of a Machine Communication Identity Module, a virtual Subscriber Identity Module, and a Universal Subscriber Identity Module.

As a further option the method includes, prior to sending each encryption key slice to respective further devices, selecting further devices to which each encryption key should be sent. In this case, the selection is optionally based on any of an expected length of time that a further device will be connected to the communication network, capabilities of a further device, and services provided by the further device.

According to a fourth aspect, there is provided a node for use in a communication network. The node is provided with a first receiver for receiving from a RO Server an encryption key slice. A memory is provided for storing the received encryption key slice. A second receiver is provided for receiving from a device a request for the encryption key slice, and a transmitter is provided for sending the encryption key slice to the device. The encryption key slice is usable by the first node to reconstruct an encryption key and decrypt an identity module for use by the device.

According to a fifth aspect, there is provided a computer program, comprising computer readable code means which, when run from a memory in a processor on a server, causes the server to perform a method as described above the third aspect of the invention.

According to a sixth aspect, there is provided a computer program, comprising computer readable code means which, when run from a memory in a processor on a device, causes the device to behave as a device as described above in the first aspect of the invention.

According to a seventh aspect, there is provided a computer program, comprising computer readable code means which, when run from a memory in a processor on a node, causes the node to behave as a node as described above in the fourth aspect of the invention.

According to an eighth aspect, there is provided a computer program product comprising a computer readable medium and a computer program as described above in any of the fifth, sixth or seventh aspects, wherein the computer program is stored on the computer readable medium.

DETAILED DESCRIPTION

The term "identity module" is used herein to refer to a collection of security data and functions that allow a device to access a communication network. This may be, for example, a Machine Communication Identity Module (MCIM) that is stored at the device in a trusted environment, or a downloadable USIM, SIM, virtual SIM, Soft SIM, smart card or encryption chip. The following description refers to the example of a MCIM for use by a device in an M2M environment, but it will be appreciated that the same methods can be used with other types of subscriber identity module such as those described above.

Figure 1:
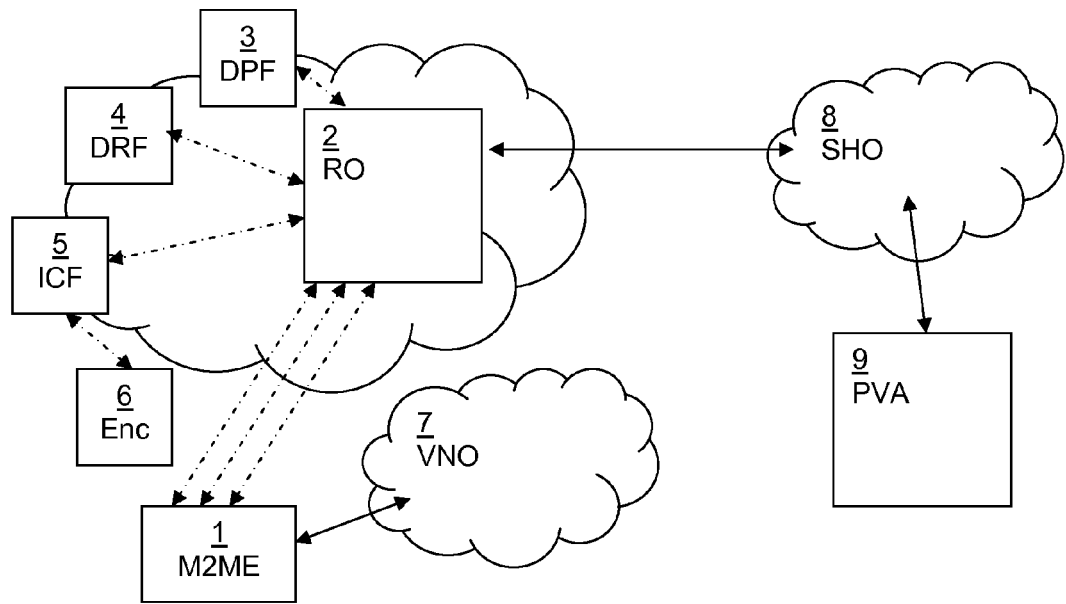
FIG. 1 illustrates schematically in a block diagram a network architecture according to an embodiment of the invention.

Turning to FIG. 1, there is illustrated a Machine to Machine Equipment (M2ME) 1. The M2ME 1 communicates with a Registration Operator (RO) 2, which has access to a Downloading and Provisioning Function (DPF) 3, a Discovery and Registration Function (DRF) 4 and an Initial Connectivity Function (ICF) 5 in order to obtain an MCIM. The DPF 3, DRF 4 and ICF 5 may be co-located with the RO 2. An encryption engine 6 is also provided. When the M2ME 1 requires an MCIM, it sends a request to the RO 2 which communicates with a Selected Home Operator (SHO) 8 and a Platform Validation Authority (PVA) 9.

In order to provide an MCIM that has a limited lifetime, portions of an encryption key (referred to herein as encryption key slices) are distributed to other M2MEs that are accessible by the RO 2. The M2ME 1 can obtain these encryption key slices to construct a full encryption key that allows the M2ME 1 to decrypt an encrypted MCIM. As other M2MEs become inactive, the encryption key slices are no longer available, and so the MCIM has a limited life as there comes a point when there are insufficient encryption key slices to reconstruct the encryption key. This ensures that subsequent attempts to reconstruct the encryption key are unsuccessful and in this event, a new MCIM must be requested.

In an exemplary embodiment of the invention, encryption key slices can be found at other M2MEs using a Distributed Hash Table (DHT). A DHT is typically used in an overlay peer-to-peer network for publication & discovery of resource information by using a store and lookup function of a DHT to find a resource with a particular resource name. A DHT is been used to break up and distribute the encryption key into encryption key slices.

Figure 2:
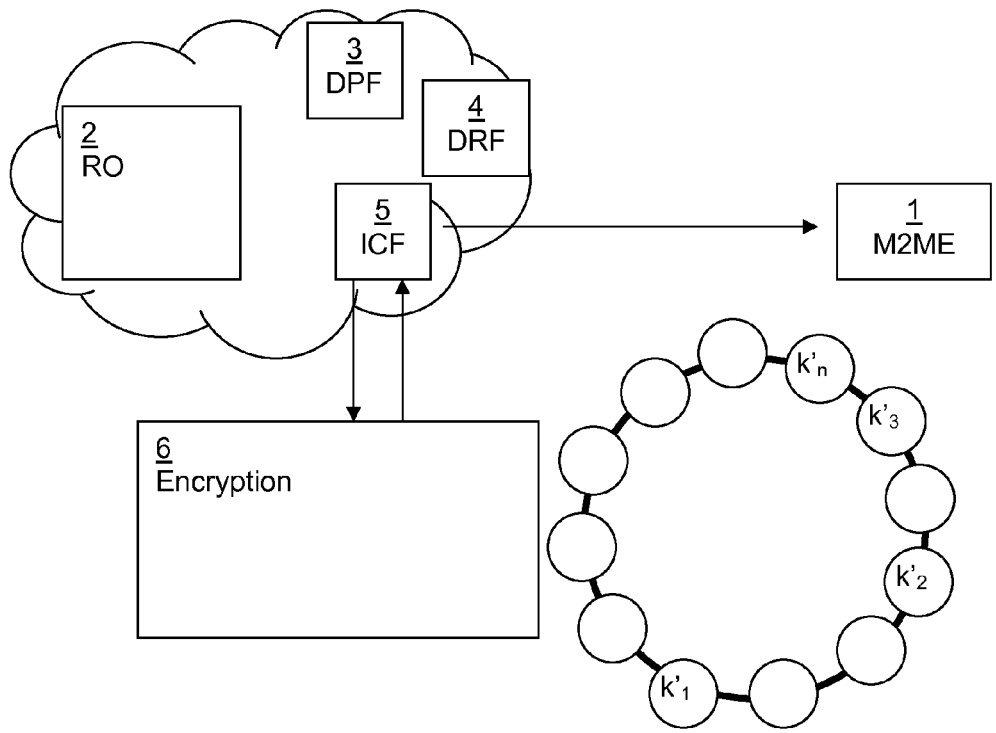
FIG. 2 illustrates schematically in a block diagram a network architecture showing how encryption key slices are distributed according to an embodiment of the invention.

Referring to FIG. 2, when the M2ME 1 sends a request to the RO 2 for an MCIM, the RO obtains an MCIM. The ICF 5 accesses the encryption engine 6 which encrypts the MCIM using an encryption key and then creates encryption key slices. The encryption key slices, $k'_1$, $k'_2$, $k'_3$ ... $k'_n$ are distributed to further devices using a DHT. The other devices, as explained above, have the properties of non-persistence, which means that encryption key slices may become unavailable. A location key is also created which specifies the location of the further device at which each encryption key slice is stored.

To manage the duration of the encryption key, the number of further devices that receive the encryption key slices and the probability of their persistence can be controlled. This ensures that the presence of the further devices that are required to retrieve the encryption key can be approximately consistent with a desired time at which the encryption key should expire. This implies that as time passes, further devices 'disappear' from the network, as they are turned off, and the encryption key slices they store are lost. The actual erasure of the encryption key slices can also be accomplished by a timer-based erase function in the memory of each further device, for instance garbage collection which activates when a memory position has not been accessed for some time, or there can be an automatic mechanism to purge the memory when the further device goes into a sleep mode. A third option is for the operator to actively move or remove encryption key slices.

To further illustrates the invention, consider a scenario in which a large installation such as a bridge, a train, a space launch facility, a radioactive isotope facility, a tractor factory uses several thousand sensors. These sensors may be, for example, environmental sensors, for instance measuring the concentration in ppm of $CO_2$, or they can be vibration sensors, radioactivity sensors measuring the background radiation, and so on. This scenario applies to a type of sensor device which can go into a sleep mode for some time, and then reactivate.

These sensors are assumed to have a wide-area network interface as well as a local interface. In this way, one of the devices is allocated to be a gateway, which collates information from the local sensor devices using the local interface, and re-transmits the collated information on the wide-area network. Any of the devices is capable of acting as gateway. It would be undesirable for all of these sensors to use be able to transmit using a wide area network interface, as this requires more power than transmitting on the local interface. Furthermore, some of the devices may not be physically location so that they can transmit using the wide-are network. The sensor devices periodically shut down and perform garbage cleaning. This could, for example, be when their memories are full, since these types of device typically have limited capacity and memory. A further assumption is that the MCIM is held in semi-permanent storage, but the encryption key and encryption key slices are not. The encryption key is erased when the device shuts down. This also applies to any encryption key slices stored by the device, but does not apply to the location key, which contains pointers to the encryption key fragments. The sensors could also follow an algorithm (for instance, round-robin) to shut themselves down, either coordinating between themselves, or being coordinated by the gateway.

In this example, at startup of the network or when the current MCIM is no longer valid, the devices attempt to connect to the RO in order to become registered with the RO. The devices then determine which of them will take the role of the gateway device. The device selected as gateway requests an MCIM from the RO. The RO obtains the MCIM as described above, and encrypts it using an encryption key. The encryption key is split into slices, and the slices distributed among the other devices. A location key is generated that gives the location of each encryption key slice. The encrypted MCIM and the location key are sent to the device. The gateway device can then use the location key to obtain the encryption key slices, and reconstruct the encryption key using the encryption key slices. The reconstructed encryption key is used to decrypt the encrypted MCIM, which can then be used by the gateway device.

The gateway device informs the other devices that they can shut down their wide-area connectivity, leaving the local interface communication mechanism for their internal communication in the sensor network (including reporting and future retrieval of key slices). Only the gateway device retains the external wide area connectivity When device memories become full (or other environmental conditions occur), the devices shut down or go to sleep mode. When shutting down or going to sleep mode, they clean out their caches and memories, removing the encryption key slices they have been allocated.

When the gateway device has gone to sleep mode and wakes up (or a different device which is more capable wakes up and takes the role of gateway), then the gateway device has the encrypted MCIM in memory, but not the encryption key. The encryption key slices must retrieved using the information obtained from the location key. If other devices that are used to store encryption key slices have been through a sleep cycle and purged their memories, then the encryption key slice that they previously stored will no longer be available. For example, the device that previously stored $k'_3$ in FIG. 2 may no longer store this encryption key slice. The gateway device will therefore be unable to obtain all of the encryption key slices required to reconstruct the encryption key, and will not be able to obtain the unencrypted MCIM. In this case, the gateway device will need to send a new request for an MCIM, and the process is repeated.

If a different device to the one which originally obtained the MCIM wishes to take over the role as gateway device, the encrypted MCIM and the location key to the encryption key slices are sent to the different device. The encryption key is retrieved from the active nodes. As described in the paragraph above, eventually insufficient encryption key slices are left for the encryption key to be reconstructed Note that there may be some redundancy in the encryption key slices; not all encryption key slices may be required to reconstruct the encryption key. In this case, the percentage of encryption key slices required may also be sent to the device.

Figure 3:
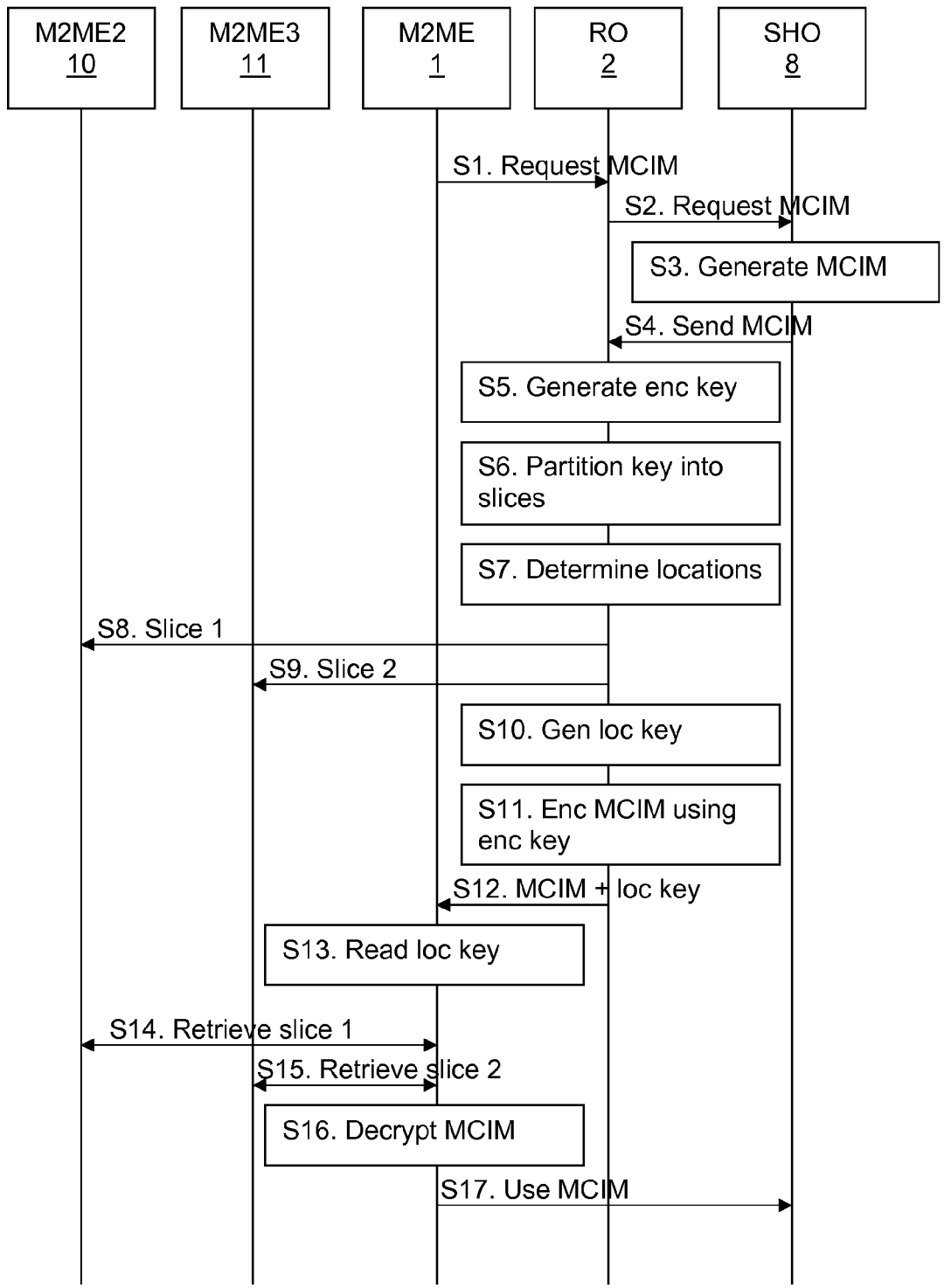
FIG. 3 is a signalling diagram illustrating signalling according to an embodiment of the invention.

Turning now to FIG. 3, there is shown a flow diagram illustrating an embodiment of the invention. In this example, M2ME 1 requires a MCIM, and encryption key slices are stored at M2ME2 10 and M2ME3 11. Typically, the encryption key slices will be stored at a larger number of devices. The following numbering corresponds to the numbering shown in FIG. 3:

S1. M2ME 1 requests an MCIM from the RO 2 via the Visited Network Operator, VNO 7 (not shown in FIG. 3). The VNO is an operator that operates a network that is accessed for the purpose of initial registration and provisioning of the MCIM. Note that the VNO and the SHO may be operated by the same or different operators.

S2. The RO 2 requests an MCIM from the SHO 8. Lookup of the SHO is done according to known mechanisms described in TR 33.812.

S3. The SHO 8 generates the MCIM. This may require encryption with a secret that is shared between the SHO 8 and M2ME 1.

S4. The MCIM is sent to the RO 2. Note that steps S2, S3 and S4 are optional; in an alternative embodiment, the RO 2 generates the MCIM or obtains it from another node.

S5. The RO 2 generates an encryption key.

S6. The RO 2 generates encryption key slices. In this example, only two encryption key slices are generated, but there could be a very large number of receivers of the encryption key slices.

S7. The RO 2 looks up locations suitable for distribution of the encryption key slices in the DHT.

S8. The RO 2 distributes key slice 1 to M2ME2 10.

S9. The RO 2 distributes key slice 2 to M2ME3 11.

S10. The RO 2 generates the location key.

S11. The RO 2 encrypts the MCIM with the encryption key.

S12. The RO distributes the encrypted MCIM plus the location key to the M2ME 1.

S13. The M2ME 1 reads the location key.

S14. M2ME 1 retrieves the first key slice from M2ME2 10.

S15. M2ME 1 retrieves the second key slice from M2ME3 11.

S16. M2ME 1 combines the key slices to reconstruct the encryption key and decrypt the MCIM using the reconstructed encryption key.

S17. M2ME 1 can start using the MCIM.

Figure 4:
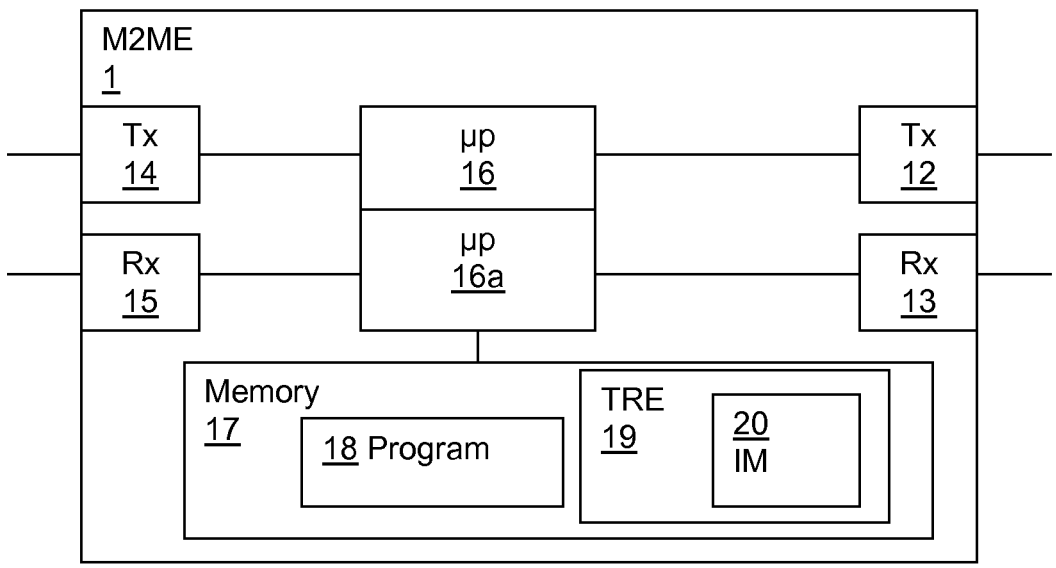
FIG. 4 illustrates schematically in a block diagram a device according to an embodiment of the invention.

Referring now to FIG. 4, there is illustrated a device such as an M2ME 1. While the above description has used an M2Me as an example, it will be appreciated that it also applies to other types of devices that require an identity module, such as a UE. The device 1 is provided with a first transmitter 12 for sending a request to the RO 2 for an identity module such as an MCIM. A first receiver 13 is provided for receiving the encrypted MCIM and the location key. A second transmitter 14 is provided for sending a request for an encryption key slice to each further device that stores an encryption key slice, and a second receiver 15 is provided for receiving encryption key slices from each further device. The figure shows a first processor 16 and a second processor 16*a*, although it will be appreciated that these processors may be implemented in the same physical processor. The first processor 16 is provided for reconstruction of the received encryption key slices; and the second processor 16*a* is provided for using the encryption key to decrypt the received encrypted identity module.

A computer readable medium in the form of a memory 17 is also provided. This may be used to store a program 18 which, when run by the processor 16, causes the device to behave as described above. The memory 17 may also include a trusted environment (TRE) 19 in which the identity module 20 is stored.

Figure 5:
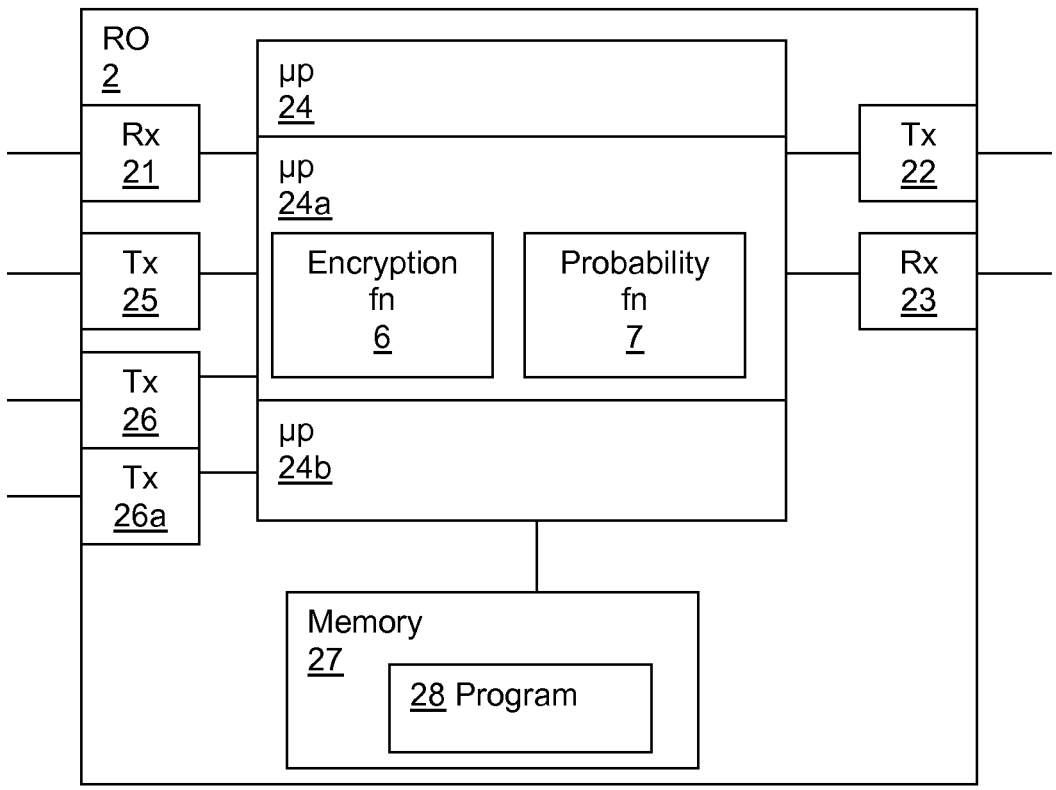
FIG. 5 illustrates schematically in a block diagram a server according to an embodiment of the invention.

Turning now to FIG. 5 herein, a server for registration, such as an RO 2 is illustrated. The server 2 is provided with a first receiver 21 for receiving from a device 1 a request for an identity module. A transmitter 22 and receiver 23 may be provided for obtaining an identity module such as an MCIM from a SHO 8. Alternatively, a first processor 24 may be provided for generating the MCIM. Note that three processors are shown, although it will be appreciated that they may be embodied in a single physical processor.

A second processor 24*a* is provided for generating the encryption key and partitioning it into encryption key slices. A first transmitter 25 is provided for sending each encryption key slice to respective further devices 10, 11 accessible by the server. As described above, this is done such that no single further device receives sufficient encryption key slices to reconstruct the encryption key. A third processor 24*b* is provided to generate the location key used to identify each encryption key slice and the further device to which it has been sent. The third processor 24*b* is further arranged to encrypt the identity module using the encryption key.

A second transmitter 26 is provided for sending the encrypted identity module to the device and a third transmitter 26*a* is provided for sending the location key to the device. Note that typically the encrypted identity module and location key will be sent in a single message using a single transmitter.

A computer readable medium in the form of a memory 27 is provided, on which ha computer program 28 may be stored. When the computer program is executed, it causes the server to behave as described above.

Figure 6:
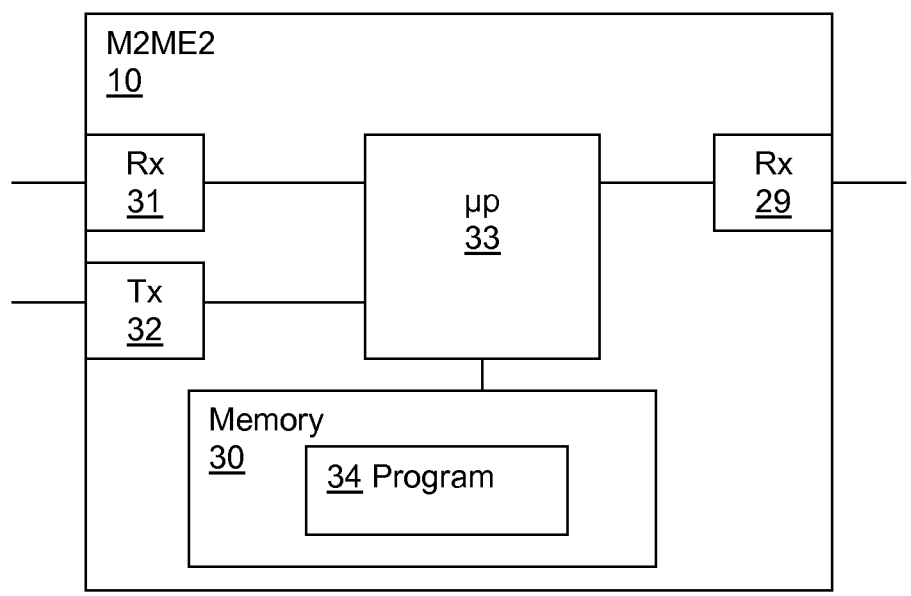
FIG. 6 illustrates schematically in a block diagram a network node for receiving an encryption key slice according to an embodiment of the invention.

Turning now to FIG. 6 herein, a node in the form of a further device is illustrated. The further device 10 is provided with a first receiver 29 for receiving an encryption key slice from the RO 2. A computer readable medium in the form of a memory 30 is provided for storing the received encryption key slice. A second receiver 31 is provided for receiving from a request for the encryption key slice, and a transmitter 32 is provided for sending the encryption key slice to the requesting device. A processor 33 is provided for controlling the further device 10, and a program 34 is stored in the memory 30 which, when run using the processor, causes the further device to behave as described above. Note that when the further device 10 is shut down or enters sleep mode, the memory 30 is purged in order to remove the stored encryption key slice.

As mentioned above, in some cases it is desirable to set the "lifetime" of the encryption key prior to issuing the device with the identity module. If the further devices are, for example, M2M devices, it is unlikely that they will all have an equal probability of entering sleep mode or shutting down at the same time, and so the life of the encryption key cannot be set in this way. This is because the further devices are likely to have a defined function to perform, for instance to send a report based on their sensor readings. The length of time that each further device will be attached to the network is then dependent on the frequency and duration of the reporting (the latter may be a function of the size of the report and the bandwidth available). For example, a further device that reports a single digit once a day will be connected to the network for a much shorter time and less infrequently than a node which has to send several kB of information each hour.

The further devices should be able to respond to requests for an encryption key even when they are also sending information, if their implementation allows that (this will, of course, also affect their suitability to be hosts to key slices). If a further device receives an encryption key slice, its operating system ensures that a priority is set so that the further device does not shut down before a received encryption key slice query has been processed.

This can be leveraged in the creation of the location key L, which is used to derive the locations of the key. If certain locations are given higher probabilities than others to be the location for storage, and these locations are likely to be connected to the network for a shorter time, the key slices allocated to them will have a shorter lifetime, meaning that a larger number of the encryption key slices will disappear in a shorter time than would otherwise be the case. After a threshold number of encryption key slices have disappeared, the encryption key can not be reconstructed, so allocating encryption key slices to the nodes which disappears fastest will give it a shorter duration than if the encryption key slices are allocated to nodes with a longer lifetime.

This will work if the likely duration of the connection is known to the Encryption Engine 6. If the initial request to the RO 2 for an MCIM contains the device capabilities, these device capabilities can be stored in the RO 2 (or the SHO 8) and used by the Encryption Engine 6 to determine which further devices should be given different probabilities in the computation of the location key L.

Note that while device capabilities are a useful descriptor for the probable up/down time, other descriptions of the service the node will perform could allow for a better estimation of up/down time. Alternatively, the further device may provide a value of expected up/downtime.

The availability of a time-limited identity module lends itself to possible new use cases between users and service providers. A user might be able to request and use 'on demand' the MCIM whenever and wherever is necessary. For example, a time limited identity module may have specific functionality to carry out a specific transaction such as an ATM withdrawal, mobile payment, 3G connection and so on. In an extreme case, an identity module may be allocated to a device for the duration of a particular transaction, for instance an ATM transaction. This could be done either by downloading the identity module to an ATM; or by downloading it to a secure device carried by the user, which then communicates with the ATM.

A further use case is where a user has several devices (e.g. mobile telephone, MP3 player, laptop etc) and these are used as a P2P network to store encryption key slices. If the user was travelling, this would allow a local temporary identity module to be provided to the mobile telephone.

It will be appreciated by the person of skill in the art that various modifications may be made to the above-described embodiments without departing from the The following abbreviations have been used in this specification:
DHT Distributed Hash Table
DPF Downloading and Provisioning Function
DRF Discovery and Registration Function
ICF Initial Connectivity Function
IMSI International Mobile Subscriber Identity
M2M Machine to Machine
M2ME Machine to Machine Equipment
MCIM Machine Communication Identity Module
PVA Platform Validation Authority
RO Registration Operator
SHO Selected Home Operator
SIM Subscriber Identity Module
UICC Universal Integrated Circuit Card
USIM Universal Subscriber Identity Module
VNO Visited Network Operator

The invention claimed is:

1. A device for use in a communication network, the device comprising:
    transmitter circuitry;
    receiver circuitry; and
    processor circuitry, operatively connected to the transmitter circuitry and receiver circuit and configured to:
        send to a server, using the transmitter circuitry, a request for an identity module for use in registering with the communication network;
        receive from the server, using the receiver circuitry and in response to the request, an encrypted identity module and a location key, the location key comprising the location of encryption key slices stored at further devices;
        send a request for an encryption key slice to each further device identified by the location key, using the receiver circuitry and in response to receiving the encrypted identity module and the location key;
        receive from each further device, using the receiver circuitry and in response to the request for an encryption key slice, an encryption key slice;
        reconstruct the received encryption key slices to form an encryption key; and
        use the encryption key to decrypt the received encrypted identity module.

2. The device of claim 1, wherein the processor circuitry is further configured to determine that the device has received insufficient encryption key slices to reconstruct the encryption key and, in the event of such a determination, send a request for a new identity module to the Registration Operator Server.

3. The device of claim 1, wherein the identity module comprises any of a Machine Communication Identity Module, a virtual Subscriber Identity Module, a Soft Subscriber Identity Module, and a Universal Subscriber Identity Module.

4. A Registration Operator Server for use in a communication network, the Registration Operator Server comprising:
    transmitter circuitry;
    receiver circuitry configured to receive, from a device, a request for an identity module;
    processor circuitry configured to, in response to the request:
        generate an identity module or to obtain an identity module by requesting an identity module from a remote node, using the transmitter circuitry, and receiving the identity module from the remote node;
        generate an encryption key and partition the encryption key into a plurality of encryption key slices such that no encryption key slice comprises the whole encryption key;
        send each encryption key slice to respective further devices accessible by the server, using the transmitter circuitry, such that no single further device receives sufficient encryption key slices to reconstruct the encryption key;
        generate a location key, the location key identifying each encryption key slice and the further device to which it has been sent, and further arranged to encrypt the identity module using the encryption key; and
        send the encrypted identity module and the location key to the device, using the transmitter circuitry, the location key being usable by the device to obtain the encryption key slices and reconstruct the encryption key.

5. The Registration Operator Server of claim 4, wherein the identity module comprises any of a Machine Communication Identity Module, a virtual Subscriber Identity Module, a Soft Subscriber Identity Module, and a Universal Subscriber Identity Module.

6. The Registration Operator Server of claim 4, wherein processor circuit is further configured to, prior to sending each encryption key slice to respective further devices, select further devices to which each encryption key should be sent.

7. The Registration Operator Server of claim 6, wherein processor circuit is configured to select further devices based on any of: an expected length of time that a further device will be connected to the communication network; capabilities of a further device;

and services provided by the further device.

8. The Registration Operator Server of claim 4, wherein the Registration Operator Server is one of a Registration Operator and a Platform Validation Authority.

9. A method of providing an identity module, to be used temporarily, to a device in a communication network, the method comprising, at a server:
   receiving, from the device, a request for the identity module;
   obtaining the identity module;
   generating an encryption key and partitioning the encryption key into a plurality of encryption key slices such that no encryption key slice comprises the whole encryption key;
   sending each encryption key slice to respective further devices accessible by the server such that no single further device receives sufficient encryption key slices to reconstruct the encryption key;
   generating a location key, the location key identifying each encryption key slice and the further device to which each encryption key slice has been sent;
   encrypting the identity module using the encryption key; and
   sending the encrypted identity module and the location key to the device, the location key being usable by the device to obtain the encryption key slices and reconstruct the encryption key, wherein the encrypted identity module and the location key are sent together;
   wherein said obtaining the identity module, generating the encryption key, sending the encryption key slices, generating the location key, encrypting the identity module, and sending the encrypted identity module and the location key are performed in response to receiving the request for the identity module.

10. The method of claim 9, wherein the identity module comprises any of a Machine Communication Identity Module, a virtual Subscriber Identity Module, and a Universal Subscriber Identity Module.

11. The method of claim 9, the method comprising:
    prior to sending each encryption key slice to respective further devices, selecting further devices to which each encryption key should be sent.

12. The method of claim 11, wherein the selection is based on any of: an expected length of time that a further device will be connected to the communication network; capabilities of a further device; and services provided by the further device.

13. A non-transitory computer-readable medium, comprising computer-readable code stored upon, wherein said computer-readable code comprises instructions that, when executed from a memory by a processor on a server, cause the server to:
    receive, from the device, a request for the identity module;
    obtain the identity module;
    generate an encryption key and partition the encryption key into a plurality of encryption key slices such that no encryption key slice comprises the whole encryption key;
    send each encryption key slice to respective further devices accessible by the server such that no single further device receives sufficient encryption key slices to reconstruct the encryption key;
    generate a location key, the location key identifying each encryption key slice and the further device to which each encryption key slice has been sent;
    encrypt the identity module using the encryption key; and
    send the encrypted identity module and the location key to the device, the location key being usable by the device to obtain the encryption key slices and reconstruct the encryption key, wherein the instructions are configured so that the encrypted identity module and the location key are sent together;
    wherein the instructions are configured so that the server obtains the identity module, generates the encryption key, sends the encryption key slices, generates the location key, encrypts the identity module, and sends the encrypted identity module and the location key in response to receiving the request for the identity module.

* * * * *